United States Patent [19]

Bartmann et al.

[11] Patent Number: 4,778,849
[45] Date of Patent: Oct. 18, 1988

[54] THERMOPLASTIC MOLDING COMPOSITIONS BASED ON POLYPHENYLENE ETHER AND AN IMPACT STRENGTH IMPROVING COMBLIKE POLYMER

[75] Inventors: Martin Bartmann, Recklinghausen; Hans Jadamus, Marl, both of Fed. Rep. of Germany

[73] Assignee: Huls Aktiengesellschaft, Marl, Fed. Rep. of Germany

[21] Appl. No.: 93,116

[22] Filed: Sep. 1, 1987

Related U.S. Application Data

[63] Continuation of Ser. No. 839,507, Mar. 14, 1986, abandoned.

[30] Foreign Application Priority Data

Mar. 14, 1985 [DE] Fed. Rep. of Germany ....... 3509092

[51] Int. Cl.$^4$ .................................. C08L 71/04
[52] U.S. Cl. ........................ 525/69; 525/68; 525/905
[58] Field of Search ............... 525/69, 905, 391

[56] References Cited

U.S. PATENT DOCUMENTS 4,020,124 4/1977 Abolins et al. .................. 525/69
4,036,912 7/1977 Stricharczuk ..................... 525/232

FOREIGN PATENT DOCUMENTS 0101873 7/1984 European Pat. Off. ............. 525/68

OTHER PUBLICATIONS

*Die Angewandte Makromolekulare Chemie*, vol. 74, (1978), pp. 17–31 (Nr. 1164), "Cokatalysatoren für die Sauer Katalysierte, Partielle Cyclisierung von Flüssigem Cis-Polybutadien", Paul Sunder-Plassmann et al.
*Die Angewandte Makromolekulare Chemie*, vol. 24, (1972), pp. 205–364 (Nr. 364), "Struktur und Lacktechnische Eigenschaften von Additionsprodukten aus Flüssigem Cis-Polybutadien und Phenol", Paul Sunder–Plassmann et al.

*Primary Examiner*—Jacob Ziegler
*Attorney, Agent, or Firm*—Oblon, Fisher, Spivak, McClelland & Maier

[57] ABSTRACT

A thermoplastic molding composition containing a polyphenylene ether, a comblike polymer with a hydrocarbon resin as the main chain and polyphenylene ether side chains, is disclosed. These compositions may possibly further contain additional polymers. Molded pieces of these polymer mixtures have improved impact strength and heat deflection temperature.

27 Claims, No Drawings

THERMOPLASTIC MOLDING COMPOSITIONS BASED ON POLYPHENYLENE ETHER AND AN IMPACT STRENGTH IMPROVING COMBLIKE POLYMER

This application is a continuation of application Ser. No. 839,507, filed on Mar. 14, 1986, now abandoned.

BACKGROUND OF THE INVENTION

1. Field of the Invention

The invention relates to thermoplastic molding compositions based on a polyphenylene ether, a comblike polymer which serves to improve impact strength, and possibly additional polymers and additives.

2. Discussion of the Background

Polyphenylene ethers are thermoplastics which may be produced on a substantial industrial scale and have high viscosity and high softening temperature. They are suited for numerous industrial applications in which high heat deflection temperature (HDT) is desirable. These polycondensates are described in (among other publications) U.S. Pat. Nos. 3,306,874, 3,306,875, 3,257,357 and 3,257,358. However, polyphenylene ethers have the disadvantage of being brittle. In addition, they are not readily processible since due to their high softening temperatures and high melt viscosities one must employ high temperatures and high shear forces which can lead to their being damaged.

Accordingly, attempts have been made to improve the processibility of polyphenylene ethers and the impact strength of the products by admixing other polymers. Mixtures of polyphenylene ethers with high impact polystyrene (HIPS), such as described in, e.g., German No. AS 21 19 301, are industrially important because not only the processibility of the polyphenylene ether melt is improved but the impact strength of the molded parts produced from the compositions is increased. However, with this known approach good processibility is achieved at the expense of a substantial loss of HDT. Also, it has been found that the resulting molded pieces often do not have sufficient impact strength and sufficiently high HDT.

It has been proposed to increase impact strength by the addition of elastomeric block mixed polymers. Thus, e.g., in German No. AS 19 32 234 and in German Nos. OSS 24 34 848, 27 13 509 and 27 50 515, there are described molding compositions comprised of polystyrenes, polyphenylene ethers, and additives comprising variously structured hydrogenated and/or non-hydrogenated block mixed polymers. The block mixed polymers employed are comprised chiefly of polymerised vinylaromatic hydrocarbons and polymerized conjugated dienes.

In German No. OS 32 26 427, molding compositions comprised of polystyrenes, polyphenylene ethers, and additives comprising a block mixed polymer are described. The blocks of the block mixed polymer comprise polyethylene, polyacrylic acid esters or polymethacrylic acid esters, polymerized vinylaromatic hydrocarbons, or polymerized conjugated dienes.

In all these mixtures, the addition of the elastomeric block mixed polymer and polyolefin resins results in a decrease in the HDT, and an inadequate increase of the impact strength. Furthermore, the elasticizing components described are applicable only for mixtures which contain both polyphenylene ethers and polystyrene resins.

Products containing such mixtures of polyphenylene ethers and polystyrene resins inherently have low HDT. Thus, commercially available mixtures of polyphenylene ethers with HIPS generally have a HDT under heating to at maximum 150° C.

There is thus a strongly felt need for a thermoplastic molding composition, based on polyphenylene ether, which can be readily processed into molded pieces having a high impact strength and having a good HDT.

SUMMARY OF THE INVENTION

Accordingly, it is an object of this invention to provide a novel resin which is based on a polyphenylene ether and which may be readily processed into molded pieces.

It is another object of this invention to provide a novel thermoplastic molding composition based on a polyphenylene ether, which can be readily processed into molded pieces having an improved impact strength.

It is another object of this invention to provide a novel thermoplastic composition, based on a polyphenylene ether, having an improved HDT.

It is another object of this invention to provide a novel thermoplastic molding composition, based on a polyphenylene ether, which can be readily processed into molded pieces having an improved impact strength and an improved HDT.

The inventors have now surprisingly discovered that all of the above objects are fully satisfied with a thermoplastic molding composition made up of:
(a) a polyphenylene ether;
(b) a high impact strength, polystyrene-free component;
(c) an optional additional polymer; and
(d) optional additives.

The high impact strength component (component b) in this composition is a comblike polymer made up of a hydrocarbon main chain having polyphenylene ether side chains.

DETAILED DESCRIPTION OF THE PREFERRED EMBODIMENTS

The starting compounds for the polyphenylene ether (Component a) include substituted phenols of the formula

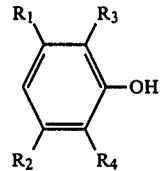

where $R_1$ and $R_2$ independently represent a methyl group or, preferably a hydrogen atom. $R_3$ and $R_4$ represent a hydrogen atom and a tertiary alkyl group with up to 6 carbon atoms (e.g., tert-butyl), respectively. Alternatively $R_3$ and $R_4$ independently represent an n-alkyl group with up to 6 carbon atoms. The preferred candidate for the monomer basis of Component a is 2,6-dimethylphenol (hereinafter, 2,6-DMP). Obviously, mixtures of these phenol monomers may be used. Particularly preferred substances for use as Component a are poly(2,6-dimethyl-1,4-phenylene ethers) having a limiting viscosity between 0.4 and 0.7 ml/g (measured in chloroform at 25° C. analogously to DIN 53 728).

The high impact strength component (b) is a combination polymer of the formula

A(B)$_n$ where A, the main chain, is a hydrocarbon, and the n chains B are polyphenylene ether side chains, with n being an integer between 2 and 70, preferably between 5 and 30.

Preferably the main chain A is a so-called EPDM resin, which is a terpolymer of ethylene, an alpha-olefin and a polyene. Preferred alpha-olefins have 3 to 10 carbon atoms. Preferred polyenes are dicyclopentadiene, 1,4-hexadiene or ethylidenenorbornene. The terpolymer preferably contains the polyene in an amount of 1–10 mol%. The EPDM resin has a molecular weight, $\overline{M}w$, of at least 1,000, particularly 10,000 to 1,000,000, and preferably between 50,000 and 500,000.

The polyphenylene ether side chains are produced from phenols monomers of the formula

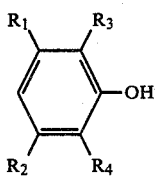

where $R_1$ and $R_2$ independently represent a methyl group or, preferably a hydrogen atom. $R_3$ and $R_4$ represent a hydrogen atom and a tertiary alkyl group with up to 6 carbon atoms (e.g., tert-butyl), respectively. Alternatively $R_3$ and $R_4$ independently represent a n-alkyl group with up to 6 carbon atoms. The preferred candidate for the monomer basis of the polyphenylene ether side chains B is 2,6-DMP.

For the initial members of the side chains, phenols having the following formula

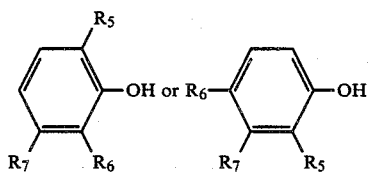

are used. $R_5$, $R_6$, and $R_7$ each independently represent a halogen atom, e.g., chlorine, bromine or iodine, a phenyl group, or an n-alkyl group with up to 6 carbon atoms, preferably methyl, $R_7$ may alternatively be a hydrogen atom.

To prepare the comblike polymers, one starts with an unsaturated hydrocarbon resin, e.g. a polyalkylene or an EPDM resin. This is reacted catalytically with phenols such as is described in, e.g., Angew. Macromol. Chem., 1972, 24: 205, and ibid., 1978, 74: 17, to produce a modified hydrocarbon having free phenolic hydroxyl groups. Then, in the presence of this product, a phenol suitable for preparing the polyphenylene ether side groups B is polymerized by oxidative coupling in the presence of a copper-amine catalyst (see German Patent Application No. P 35 09 093.6, "Hydrocarbon resin/-polyphenylene ether comblike polymers and their mixtures with polyphenylene ethers, and methods of preparing such comblike polymers", application date Mar. 14, 1985). The relevant parts of German Patent Application No. P 35 09 093.6 are included in the text below.

In this way a mixture of a pure polyphenylene ether and a comblike polymer is obtained from which the comblike polymer can be isolated by precipitation.

The thermoplastic molding compositions may also contain additional polymers (Component c). The preferred candidates for such additional polymers are polystyrene resins, either unmodified or (HIPS) modified for increased impact strength.

Other additives (Component d) are pigments, colorants, fillers, fire retardants, antistatics, antioxidants and lubricants.

Preferably the amount of the high impact strength component (Component b) is 1–50 wt.% of the total of Components (a), (b) and (c).

The ratio of Component (a) to Component (c) may vary within a wide range. In order to ensure high HDT, however, the amount of Component (c) should not exceed 50 wt.% of the amount of Component (a).

The present molding compositions can be prepared in the usual equipment of a type enabling homogeneous mixing of the pure components, e.g. kneaders or extruders, or by dissolving the components and then evaporating the solvent. A particularly suitable method is described in German No. OS 33 37 629 (U.S. patent application Ser. No. 657,247, filed Oct. 3, 1984, now abandoned, which is hereby incorporated by reference).

In comparison to known molding compositions containing of comparable amounts of HIPS or unmodified EPDM resin, the present molding compositions have improved shape stability under heating and higher impact strength.

The following is a copy of the relevant parts of German Patent Application No. P 35 09 093.6:

The invention of German Patent Application No. P 35 09 093.6 provides a method for preparing polymers having recurring units of formula:

$-(\text{Ar}-\text{O})-$ by the oxidative coupling reaction of an ortho-substituted phenol (Component I) in the presence of a 2,4,6-trisubstituted phenol (Component II) and a copper-amine catalyst. Such copper-amine catalysts are well known in this art.

Candidates for the substituted phenols (Component I) include compounds of the general formula

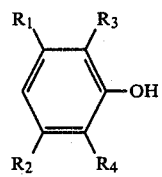

where $R_1$ and $R_2$ are independently a methyl group or a hydrogen atom, preferably hydrogen atom. $R_3$ and $R_4$ are a hydrogen atom and a tertiary alkyl group containing up to 6 C atoms, e.g., tertiary butyl, respectively. Alternatively $R_3$ and $R_4$ each may independently represent an n-alkyl group having up to 6 C atoms. Preferably 2,6-dimethylphenol is employed. Obviously, mixtures of these monomeric phenols may also be employed.

The trisubstituted phenol component (Component II) may be characterized by the formula:

$A(B)_n$, where A is derived from the basic framework of a hydrocarbon resin, and B represents a phenolic side group of formula

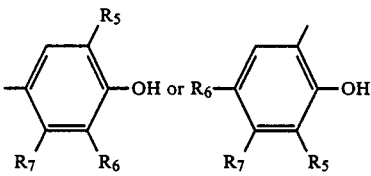

The groups $R_5$, $R_6$ and $R_7$ each represent a halogen atom, e.g., chlorine, bromone or iodine, a phenyl group, or an n-alkyl group having up to 6 C atoms, preferably a methyl group. Group $R_7$ may also alternatively be a hydrogen atom. And n is the number of phenolic side groups bound to one molecule of the hydrocarbon resin. The average value of n is between 2 and 70, preferably between 5 and 30.

The modified hydrocarbon resins (Component II) of general formula $A(B)_n$ are obtained by reacting unsaturated hydrocarbon resins (Component III) with phenols (Component IV) of formula

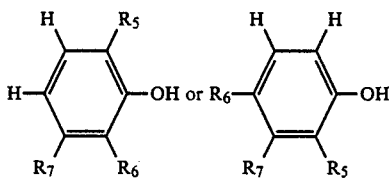

where $R_5$, $R_6$ and $R_7$ have the same meanings as above (see *Angew. Macromol. Chem.*, 24, 205 (1972) and 74, 17 (1978)). Preferably, $R_5$ and $R_6$ each represent a methyl group and $R_7$ represents a hydrogen atom.

The addition of the phenol to the unsaturated hydrocarbon resin is carried out in customary fashion in the presence of an acid. Suitable acids include, e.g., sulfuric, perchloric, p-toluenesulfonic, methanesulfonic and benzenesulfonic. Methanesulfonic acid is preferred.

Suitable unsaturated hydrocarbon resins (Component III) have a molecular weight of 1,000 to 1,000,000, preferably 50,000 to 500,000. Preferably the double bonds of the hydrocarbon resin are not conjugated with each other. On average, the maximum number of double bonds should be 20 per 100 carbon-carbon bonds. As a rule there is at least one double bond. Suitable such unsaturated hydrocarbon resins include terpolymers of ethylene, propylene, and some diene (such terpolymers are also called "EPDM" resins). A terpolymer of ethylene, propylene and ethylidenenorbornene is particularly suitable. Polyalkenylenes obtained by ring-opening polymerization of a cyclic olefin with 5 to 12 carbon atoms, particularly polyoctenylenes, are also suitable.

The number n of added phenolic groups per molecule depends on, among other things, the molecular weight and the double bond content of the unsaturated hydrocarbon resin employed.

A mixture of the modified hydrocarbon resin (Component II) described immediately supra and the substituted phenols (Component I) is subjected to the oxidative coupling reaction. The amount of the modified hydrocarbon resin (Component II) in this mixture is between 1 and 50 wt.%, preferably between 3 and 20 wt.%.

Such a mixture can be prepared by simply combining the two components (Components I and II). It is also possible to react the unsaturated hydrocarbon resin (Component II) initially with an excess of phenol and then to directly subject the resulting reaction mixture to the oxidative coupling reaction. Preferably this oxidative coupling reaction is carried according to the method of German Nos. OS S 32 24 692 and 33 13 864 (U.S. patent application Ser. No. 429,106 and U.S. patent application Ser. No. 582,711, filed Feb. 23, 1984, now U.S. Pat. No. 4,537,948, respectively), and German Patent Application No. P 33 32 377.1 (U.S. patent application Ser. No. 632,125, filed July 18, 1984, now U.S. Pat. No. 4,659,803). These references are all hereby incorporated by reference.

The solutions of polyphenylene ether and the hydrocarbon resin/polyphenylene ether comblike polymer obtained by oxidative coupling can be worked up according to the usual methods, e.g., by common precipitation by means of addition of a precipitating agent; or by direct isolation methods (spray drying or hot-water comminution); or directly by means of evaporation concentration by degassing, according to German Patent Application No. P 33 37 629.8 (U.S. patent application Ser. No. 657,247, filed Oct. 3, 1984) (entitled "Method for preparing thermoplastic molding compounds containing polyphenylene ethers"). This reference is hereby incorporated by reference.

From the thus obtained mixture which contains only the polyphenylene ether and the hydrocarbon resin/polyphenylene ether comblike polymer, the latter can be separated out as follows:

The mixture is dissolved in a solvent which can dissolve both components. Such solvents included toluene, benzene, ethylbenzene, xylene, chloroform, chlorobenzene or dichlorobenzene. The preferred solvent is toluene. An anti-solvent, i.e., a precipitating agent which is a solvent in which the polyphenylene ether is insoluble but the comblike polymer is soluble, is added to this solution. Suitable anti-solvents are, e.g., hexane, heptane or cyclohexane. After the polyphenylene ether is separated out, the resulting solution is concentrated by evaporation to recover the comblike polymer.

Another possibility is to start with an organic solution of the reaction product obtained immediately after the oxidative coupling reaction. A precondition for this is that the solvent chosen for the oxidative coupling reaction adequately dissolves the reaction product. Such solvents may be identified from the relevant literature. A particularly suitable such solvent is toluene. The anti-solvent is then added, and the comblike polymer is isolated as described supra.

The comblike polymer itself, and mixtures of it with polyphenylene ethers, are of great interest for the preparation of molding compounds with novel properties.

Other features of the present invention will become apparent in the course of the following description of examplary embodiments which are given for illustration of the invention and are not intended to be limiting thereof.

EXAMPLE 1

At 150° C. under nitrogen, a solution containing of 50 g methanesulfonic acid, 200 g xylene and 200 g 2,6-DMP was added dropwise to a mixture of 2 kg EPDM resin (prepared from ethene in the amount of 48 wt.%, propene in the amount of 42 wt.%, and 5-ethylidenebicyclo[2.2.1]-2-heptene in the amount of 10 wt.%, the resin having a Mooney viscosity (1+4) at 100° C.=45, and further having an average molecular weight, $\overline{M}w$, of 160,000) and 17.8 kg 2,6-DMP.

The reaction mixture was allowed to react 4 hr, cooled to 100° C. and diluted with 50 kg toluene. After cooling to room temperature, the resulting solution was washed with neutral water and then dried (i.e., dewatered) over sodium sulfate.

A sample of the resulting (washed and de-watered) solution, containing the modified EPDM resin and 2,6-DMP, was worked up (i.e., to isolate the modified EPDM resin). Analysis by IR and UV showed that the modified EPDM resin had a content of 1.5 wt.% incorporated phenol.

EXAMPLE 2

A mixture of 140 kg toluene, 26 kg methanol, 3.6 kg morpholine, and a solution of 0.2 kg cupric carbonate in 0.7 kg 48% hydrobromic acid were charged into a stirred vessel. The solution of 2,6-DMP and modified EPDM resin in toluene (which solution was prepared in Example 1) was added over a period of 30 min, with stirring (250 rpm) and passage of an air stream of 8 m³/hr through the mixture. 60 min following the completion of this addition, the polycondensation was interrupted by adding aqueous acetic acid. The polymer mixture was precipitated from the organic phase by addition of methanol, and was then filtered out and dried.

Yield=19 kg. J-value=75 ml/g. NMR spectra: 22%. H aromatic, delta=6.5 (s); 68% H Ar-CH3, delta=2.1 (S); 7% H alkyl-CH2-alkyl, delta=1.3 (m); 3% H alkyl-CH3, delta=0.9 (m).

By GLPC analysis the product was a mixture of c. 75 wt.% pure poly(2,6-dimethyl-1,4-phenylene ether) (PPE) and 25 wt.% a PPE-EPDM comblike polymer. Average m.w. of the PPE=c. 35,000. Average m.w. of the PPE/EPDM comblike polymer=c. 400,000. 10 wt.% of the polymer mixture was EPDM resin.

EXAMPLES 3 AND 4, AND COMPARISON EXAMPLES A TO C

Polymer mixtures were prepared with the aid of a two-shaft extruder, with addition of 0.5 wt.% didecyl thenyl phosphate (commercially available as "Irgastab ® CH 300" from Ciba-Geigy), 0.5 wt.% 3-(3,5-di-tert-butyl-4hydroxyphenyl)propanoic acid octadecyl ester (commercially available as "Irganox ® 1076" from Ciba-Geigy), and 1.5 wt.% oxidized polyethylene wax with molecular weight 1,500 (commercially available as "Vestowax ® AO 1539", manufactured by Huels AG).

The cylinder temperature was 280°–300° C., but only 230° C. in Example 4.

In Example 3, the starting material was a PPE-/EPDM-PPE mixture with 10 wt.% EPDM resin (according to Example 2). To this HIPS was added.

In Example 4, a PPE/EPDM-PPE mixture with EPDM resin in the amount of 20 wt.% was prepared analogously in Example 2, and unmodified polystyrene was mixed in.

Comparison Examples A to C comprised polymer mixtures without an EPDM-PPE comblike polymer.

The HIPS used in Examples 3, B, and C was "Vestyron ® 616", manufactured by Huels AG. The unmodified polystyrene used in Example 4 was "Vestyron ® 114", also manufactured by Huels AG. The characteristic parameters of these products may be obtained from the bronchure entitled "Plastics of Huels—Vestyron ®", edition of September, 1983.

The properties of the polymer mixtures were determined using test bodies prepared at 260° C. with the aid of an injection molding machine.

TABLE 1

Results of Examples 2 to 4, and A to C:

| Example no. | PPE, wt. % | EPDM-PPE (comblike polymer) | HIPS, wt. % | Unmodified EPDM, wt. % | Vicat softening temperature, °C.** | Impact strength by notched-bar impact test (DIN 53 457), kJ/m² |
|---|---|---|---|---|---|---|
| 2 | 75 | 25 (10, 15)* | — | — | 205 | 26 |
| 3 | 45 | 15 (6, 9)* | 40 | — | 156 | 13 |
| 4 | 30 | 30 (12, 18)* | 40 | — | 141 | 20 |
| A | 90 | — | — | 10 | 193 | 19 |
| B | 60 | — | 40 | — | 157 | 11 |
| C | 54 | — | 40 | 6 | 150 | 6 |

*Data given in parenthesis are the amounts of EPDM and PPE, respectively, in the comblike polymer in wt. % of the total resin mixture.
**VST/A/50° C., according to DIN 53 A60.

Example 4 shows that even with unmodified polystyrene a product with high impact strength is obtained.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A thermoplastic molding composition, comprising a thermoplastic mixture of:
   (a) a polyphenylene ether; and
   (b) a high impact strength, polystyrene-free component; wherein the said high impact strength component (component b) is a thermoplastic comblike polymer made up of a hydrocarbon main chain and polyphenylene ethers as side chains.

2. A thermoplastic molding composition, comprising a thermoplastic mixture of:
   (a) a polyphenylene ether; and
   (b) a high impact strength, polystyrene-free component; wherein the said high impact strength component (component b) is a thermoplastic comblike polymer made up of a hydrocarbon main chain and polyphenylene ethers as side chains; wherein the said comblike polymer (component b) is prepared by reacting a phenol of formulae

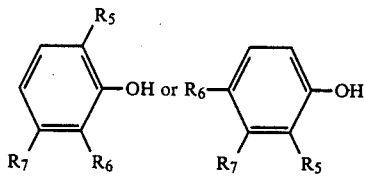

with an unsaturated hydrocarbon to obtain a hydrocarbon main chain with phenol groups of formula (I) or (II) side groups

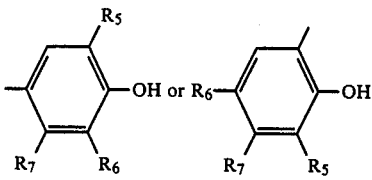

and
condensing at the oxygen atoms of these phenol side groups, a phenol of the formula:

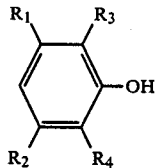

wherein $R_1$ to $R_7$ represent the following:
$R_1$ and $R_2$ each independently represent a methyl group or a hydrogen atom;
$R_3$ and $R_4$ represent a hydrogen atom or a tertiary alkyl group having up to 6 carbon atoms, respectively, or $R_3$ and $R_4$ each independently represent a n-alkyl group having up to 6 carbon atoms; and
$R_5$, $R_6$ and $R_7$ each independently represent a halogen atom, a phenyl group, or a n-alkyl group having up to 6 carbon atoms, and $R_7$ represents independently also a hydrogen atoms.

3. The thermoplastic molding composition of one of claims 1 or 2, wherein the said side chains of the comblike polymer are produced from poly(2,6-dimethyl-1,4-phenylene ether).

4. The thermoplastic molding composition of claim 1, wherein the main chain of the comblike polymer is derived from an ethylene-propylene-diene polymer resin.

5. The thermoplastic molding composition of claim 1, wherein on the average, per molecule, there are 2 to 70 polyphenylene ether side chains on the main chain of the comblike polymer.

6. The thermoplastic molding composition of claim 1, wherein the said composition comprises an additional polymer (component c).

7. The thermoplastic molding composition of claim 1, wherein the said composition comprises an additive.

8. The thermoplastic molding composition of claim 6, wherein the said additional polymer comprises a polystyrene resin.

9. The thermoplastic molding composition of claim 7, wherein the said additive comprises a pigment, a colorant, a filler, a fire retardant, an anti-static, an anti-oxidant or a lubricant.

10. The thermoplastic molding composition of claim 2, wherein $R_1$ and $R_2$ are each a hydrogen atom.

11. The thermoplastic molding composition of claim 2, wherein $R_4$ is a tert-butyl group.

12. The thermoplastic molding composition of claim 2, wherein $R_5$, $R_6$ and $R_7$ are each a methyl group.

13. The thermoplastic molding composition of claim 5, wherein, on the average, per molecule, there are 5 to 30 polyphenylene ether side chains on the main chain of the comblike polymer.

14. The thermoplastic molding composition of claim 2, wherein the main chain of the comblike polymer is derived from an ethylene-propylene-diene polymer resin.

15. The thermoplastic molding composition of claim 3, wherein the main chain of the comblike polymer is derived from an ethylene-propylene-diene polymer resin.

16. The thermoplastic molding composition of claim 2, wherein on the average, per molecule, there are 2 to 70 polyphenylene ether side chains on the main chain of the comblike polymer.

17. The thermoplastic molding composition of claim 3, wherein on the average, per molecule, there are 2 to 70 polyphenylene ether side chains on the main chain of the comblike polymer.

18. The thermoplastic molding composition of claim 4, wherein on the average, per molecule, there are 2 to 70 polyphenylene ether side chains on the main chain of the comblike polymer.

19. The thermoplastic molding composition of claim 6, wherein the said high impact strength component (Component b) is present in an amount of 1 to 50 wt.% of the total of components (a), (b) and (c).

20. The thermoplastic molding composition of claim 16, wherein on the average, per molecule, there are 5 to 30 polyphenylene ether side chains on the main chain of the comblike polymer.

21. The thermoplastic molding composition of claim 17, wherein on the average, per molecule, there are 5 to 30 polyphenylene ether side chains on the main chain of the comblike polymer.

22. The thermoplastic molding composition of claim 18, wherein on the average, per molecule, there are 5 to 30 polyphenylene ether side chains on the main chain of the comblike polymer.

23. The thermoplastic molding composition of claim 1, comprising an additional polymer (component c), wherein the said high impact strength component (component b) is present in an amount of 1 to 50 wt.% of the total of components (a), (b) and (c).

24. The thermoplastic molding composition of claim 2, comprising an additional polymer (component c), wherein the said high impact strength component (component b) is present in an amount of 1 to 50 wt.% of the total of components (a), (b) and (c).

25. The thermoplastic molding composition of claim 3, comprising an additional polymer (component c), wherein the said high impact strength component (component b) is present in an amount of 1 to 50 wt.% of the total of components (a), (b) and (c).

26. The thermoplastic molding composition of claim 4, comprising an additional polymer (component c), wherein the said high impact strength component (component b) is present in an amount of 1 to 50 wt.% of the total of components (a), (b) and (c).

27. The thermoplastic molding composition of claim 5, comprising an additional polymer (component c), wherein the said high impact strength component (component b) is present in an amount of 1 to 50 wt.% of the total of components (a), (b) and (c).

* * * * *

UNITED STATES PATENT AND TRADEMARK OFFICE
CERTIFICATE OF CORRECTION

PATENT NO. : 4,778,849

DATED : OCTOBER 18, 1988

INVENTOR(S) : MARTIN BARTMANN ET AL

It is certified that error appears in the above-identified patent and that said Letters Patent is hereby corrected as shown below:

Column 1, line 53, delete "ised vinylaromatic" and insert --ized vinylaromatic--.

Column 3, line 20, delete "phenols" and insert --phenol--.

Column 3, line 33, delete "a" and insert --an--.

Column 3, line 51, delete "methyl," and insert --methyl.--.

Column 4, line 26, delete "Oct. 3, 1984" and insert --March 10, 1984--.

Column 4, line 28, after "taining", delete "of".

Column 4, line 67, delete "formula:" and insert --formula--.

Column 5, line 37, delete "24, 205 (1972) and 74, 17" and insert --24:205 (1972) and 74:17--.

Column 6, line 9, after "carried" insert --out--.

Column 6, line 11, delete "patent application Ser. No. 429,106" and insert --Patent No. 4,429,106--.

Column 6, line 27, delete "Oct. 3, 1984)" and insert --March 10, 1984)--.

Column 6, line 65, after "containing" delete "of".

UNITED STATES PATENT AND TRADEMARK OFFICE
CERTIFICATE OF CORRECTION

PATENT NO. : 4,778,849  
DATED : OCTOBER 18, 1988  
INVENTOR(S) : MARTIN BARTMANN ET AL

Page 2 of 3

It is certified that error appears in the above-identified patent and that said Letters Patent is hereby corrected as shown below:

Column 7, line 9, delete (i.e., dewa-" and insert --(i.e., de-wa---.

Column 7, TABLE 1, line 15, delete "parenthesis" and insert --parentheses--.

Column 7, line 49, delete "Ar-CH3," and insert --Ar-CH$_3$,--.

Column 7, line 50, delete "alkyl-CH2-alkyl," and insert --alkyl-CH$_2$-alkyl,--.

Column 7, line 51, delete "CH3," and insert --CH$_3$,--.

Column 7, line 50, delete "(S)," and insert --(s),--.

Column 7, line 65, delete "tert-butyl-4hydroxyphenyl)propanoic" and insert --tert-butyl-4-hydroxyphenyl)propanoic--.

Column 8, line 12, delete "polymer." and insert --polymer--.

Column 8, line 19, delete "bronchure" and insert --brochure--.

Column 8, line 19, delete "Huel-" and insert --Huels--.

Column 9, line 24, delete "formula:" and insert --formula--.

Column 9, line 38, delete "a" and insert --an--.

UNITED STATES PATENT AND TRADEMARK OFFICE
CERTIFICATE OF CORRECTION

PATENT NO. : 4,778,849

DATED : OCTOBER 18, 1988

INVENTOR(S) : MARTIN BARTMANN ET AL

It is certified that error appears in the above-identified patent and that said Letters Patent is hereby corrected as shown below:

Column 9, line 41, delete "or a" and insert --or an--.

Column 9, line 43, delete "atoms." and insert --atom.--.

Signed and Sealed this

Thirteenth Day of June, 1989

Attest:

DONALD J. QUIGG

Attesting Officer

Commissioner of Patents and Trademarks